US007411589B2

(12) United States Patent
Haim et al.

(10) Patent No.: US 7,411,589 B2
(45) Date of Patent: Aug. 12, 2008

(54) LIQUID CRYSTAL COLOR DISPLAY SYSTEM AND METHOD

(75) Inventors: Victoria P. Haim, Glendale, AZ (US); James L. Triplett, Peoria, AZ (US); Harold A. Zulch, III, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 574 days.

(21) Appl. No.: 10/837,196

(22) Filed: Apr. 30, 2004

(65) Prior Publication Data

US 2005/0243107 A1 Nov. 3, 2005

(51) Int. Cl.
*G06T 11/00* (2006.01)

(52) U.S. Cl. .................... 345/470; 345/467; 345/469.1; 345/471

(58) Field of Classification Search ................. 345/204, 345/690, 694, 598, 599, 88, 89, 600–602, 345/589, 596, 467–472.3, 605, 611–618
See application file for complete search history.

(56) References Cited

U.S. PATENT DOCUMENTS 4,709,990 A * 12/1987 Oana .......................... 349/187
4,730,185 A * 3/1988 Springer et al. ............. 345/536
5,374,956 A * 12/1994 D'Luna ...................... 348/275
5,606,437 A 2/1997 Mosier
5,613,103 A * 3/1997 Nobutani et al. ............ 345/556
5,699,076 A * 12/1997 Tomiyasu ................... 345/103
5,880,741 A * 3/1999 Takeuchi .................... 345/626
6,067,063 A 5/2000 Kim et al.
6,118,413 A * 9/2000 Bril et al. .................... 345/596
6,556,181 B2 * 4/2003 Yamada et al. ................ 345/88
6,965,358 B1 * 11/2005 Kasahara et al. .............. 345/63
6,995,803 B2 * 2/2006 Wang et al. ................. 348/607
7,259,889 B1 * 8/2007 Walmsley ................... 358/1.9
2002/0015046 A1 * 2/2002 Okada et al. ................ 345/613
2002/0113764 A1 * 8/2002 Yamada et al. ................ 345/88
2004/0061711 A1 4/2004 Kurumisawa

OTHER PUBLICATIONS

PCT International Search Report: PCT/US2005/014516, Applicant Reference No. H0006029.65882, Dec. 27, 2005, EP International Search Authority, 7 pages.
Wright, S.L. et al., "17.4: Low-cost Method to Improve Viewing-Angle Characteristics of Twisted-Nematic Mode Liquid-Crystal Display," SID 02 DIGEST, vol. XXXIII, 2002, pp. 717-719.

* cited by examiner

*Primary Examiner*—Sumati Lefkowitz
*Assistant Examiner*—Robert E Carter, III
(74) *Attorney, Agent, or Firm*—Ingrassia, Fisher & Lorenz, P.C.

(57) ABSTRACT

Methods and apparatus are provided for a color liquid crystal display (CLCD). The apparatus includes a processor coupled to the CLCD for receiving a character code and a color code and translating them into character and color pixel arrays that are overlaid and summed to produce a composite pixel array corresponding to the CLCD pixel array, where each entry in the composite array is used in conjunction with a color table to establish drive levels for each pixel in the CLCD. The character pixel array includes gray level color mixing and the color pixel array includes spatial shading color mixing, so that the composite array uses both techniques to determine the individual CLCD pixel drive levels to provide a wider range of color choices without significant color dependence on viewing angle.

13 Claims, 6 Drawing Sheets

110

94

| | | | | | | | | | | | | | | | | | |
|---|---|---|---|---|---|---|---|---|---|---|---|---|---|---|---|---|---|
| 0 | 4 | 0 | 4 | 0 | 4 | 0 | 4 | 0 | 4 | 0 | 4 | 0 | 4 | 0 | 4 | 0 | 4 |
| 4 | 0 | 4 | 0 | 4 | 0 | 4 | 0 | 4 | 0 | 4 | 0 | 4 | 0 | 4 | 0 | 4 | 0 |
| 0 | 4 | 0 | 4 | 0 | 4 | 0 | 4 | 0 | 4 | 0 | 4 | 0 | 4 | 0 | 4 | 0 | 4 |
| 4 | 0 | 4 | 0 | 4 | 0 | 4 | 0 | 4 | 0 | 4 | 0 | 4 | 0 | 4 | 0 | 4 | 0 |
| 0 | 4 | 0 | 4 | 0 | 4 | 0 | 4 | 3 | 7 | 0 | 4 | 0 | 4 | 0 | 4 | 0 | 4 |
| 4 | 0 | 4 | 0 | 4 | 0 | 4 | 1 | 7 | 3 | 4 | 0 | 4 | 0 | 4 | 0 | 4 | 0 |
| 0 | 4 | 0 | 4 | 0 | 4 | 0 | 6 | 3 | 7 | 1 | 4 | 0 | 4 | 0 | 4 | 0 | 4 |
| 4 | 0 | 4 | 0 | 4 | 0 | 4 | 3 | 7 | 3 | 7 | 0 | 4 | 0 | 4 | 0 | 4 | 0 |
| 0 | 4 | 0 | 4 | 0 | 4 | 0 | 7 | 3 | 7 | 3 | 4 | 0 | 4 | 0 | 4 | 0 | 4 |
| 4 | 0 | 4 | 0 | 4 | 0 | 5 | 3 | 7 | 3 | 7 | 1 | 4 | 0 | 4 | 0 | 4 | 0 |
| 0 | 4 | 0 | 4 | 0 | 4 | 2 | 7 | 2 | 6 | 3 | 6 | 0 | 4 | 0 | 4 | 0 | 4 |
| 4 | 0 | 4 | 0 | 4 | 0 | 7 | 3 | 4 | 0 | 7 | 3 | 4 | 0 | 4 | 0 | 4 | 0 |
| 0 | 4 | 0 | 4 | 0 | 4 | 3 | 7 | 0 | 4 | 3 | 7 | 0 | 4 | 0 | 4 | 0 | 4 |
| 4 | 0 | 4 | 0 | 4 | 2 | 7 | 2 | 4 | 0 | 7 | 3 | 5 | 0 | 4 | 0 | 4 | 0 |
| 0 | 4 | 0 | 4 | 0 | 7 | 3 | 5 | 0 | 4 | 2 | 7 | 2 | 4 | 0 | 4 | 0 | 4 |
| 4 | 0 | 4 | 0 | 4 | 3 | 7 | 0 | 4 | 0 | 4 | 3 | 7 | 0 | 4 | 0 | 4 | 0 |
| 0 | 4 | 0 | 4 | 1 | 7 | 3 | 7 | 3 | 7 | 3 | 7 | 3 | 5 | 0 | 4 | 0 | 4 |
| 4 | 0 | 4 | 0 | 6 | 3 | 7 | 3 | 7 | 3 | 7 | 3 | 7 | 2 | 4 | 0 | 4 | 0 |
| 0 | 4 | 0 | 4 | 3 | 7 | 1 | 4 | 0 | 4 | 0 | 4 | 3 | 7 | 0 | 4 | 0 | 4 |
| 4 | 0 | 4 | 0 | 7 | 3 | 4 | 0 | 4 | 0 | 4 | 0 | 7 | 3 | 4 | 0 | 4 | 0 |
| 0 | 4 | 0 | 5 | 3 | 7 | 0 | 4 | 0 | 4 | 0 | 4 | 3 | 7 | 1 | 4 | 0 | 4 |
| 4 | 0 | 4 | 2 | 7 | 1 | 4 | 0 | 4 | 0 | 4 | 0 | 6 | 3 | 6 | 0 | 4 | 0 |
| 0 | 4 | 0 | 7 | 3 | 4 | 0 | 4 | 0 | 4 | 0 | 4 | 1 | 7 | 3 | 4 | 0 | 4 |
| 4 | 0 | 4 | 3 | 7 | 0 | 4 | 0 | 4 | 0 | 4 | 0 | 4 | 3 | 7 | 0 | 4 | 0 |
| 0 | 4 | 0 | 4 | 0 | 4 | 0 | 4 | 0 | 4 | 0 | 4 | 0 | 4 | 0 | 4 | 0 | 4 |
| 4 | 0 | 4 | 0 | 4 | 0 | 4 | 0 | 4 | 0 | 4 | 0 | 4 | 0 | 4 | 0 | 4 | 0 |
| 0 | 4 | 0 | 4 | 0 | 4 | 0 | 4 | 0 | 4 | 0 | 4 | 0 | 4 | 0 | 4 | 0 | 4 |

*FIG. 5*

120

| COLOR TABLE | | | | |
|---|---|---|---|---|
| CA#'s | AMBER | RED | GREEN | BLUE |
| 0 | GL-0 | 0 | 0 | 0 |
| 1 | GL-2 | 172 | 132 | 0 |
| 2 | GL-4 | 212 | 168 | 0 |
| 3 | GL-7 | 252 | 220 | 0 |
| 4 | GL-0 | 0 | 0 | 0 |
| 5 | GL-2 | 172 | 0 | 0 |
| 6 | GL-4 | 212 | 0 | 0 |
| 7 | GL-7 | 252 | 0 | 0 |

*FIG. 6*

| TEST COLOR | METHOD USED | ANGLE SHIFT IN $u'$ | ANGLE SHIFT IN $v'$ | TARGET COLOR POSSIBLE? |
|---|---|---|---|---|
| 252 AMBER | GRAY LEVEL MIXING | 0.071 | 0.002 | Yes, but too much Angle Shift |
| 254 AMBER | SPATIAL SHADING | 0.014 | 0.002 | Target Color not achievable |
| 256 AMBER | COMBINED GRAY LEVEL MIXING & SPATIAL SHADING | 0.042 | 0.004 | Yes |

LIQUID CRYSTAL COLOR DISPLAY SYSTEM AND METHOD

TECHNICAL FIELD

The present invention generally relates to liquid crystal displays, and more particularly to color generation for liquid crystal displays.

BACKGROUND

Liquid crystal displays able to show alphanumeric and/or graphical information in various colors are well known in the art. Such liquid crystal color displays are used in avionics, computers, telephones, medical imaging, vehicles, and various other applications. In many cases the displayed colors may convey functional information. For example, and not intended to be limiting, text, numbers, and/or symbols, or a combination thereof may signify a substantially 'safe' condition when presented in green, a 'caution' condition when presented in yellow or amber, and a potential 'danger' condition when presented in red. In such instances, the color of the image is intended to convey information to the user, in addition to or as a supplement to the information provided by the content of the image. Thus, color fidelity including color fidelity as a function of viewing angle or other factors, can be important. For example, if the color perceived by the viewer changes depending upon, for example, viewing angle, or the image contrast or luminance, this can potentially lead to mistaken interpretation of the displayed information. In addition, various users desire that the colors presented conform to particular standards. Thus, having a large number of color choices may also be important.

While present day color liquid crystal displays are very useful they do suffer certain drawbacks. For example, the viewing angle over which color fidelity is reasonably preserved may be undesirably narrow, and/or the absolute color provided by the display can vary depending upon the drive intensity, and/or the number of possible colors that can be displayed may be undesirably limited, and/or the display brightness may be weak and insufficient to permit easy viewing in sunlight or other bright light conditions, and so forth. Further, color fidelity, color choice, luminance or brightness, viewing angle, and other properties often mutually interact so that prior art approaches for improving one property may cause degradation in another property.

Accordingly, it is desirable to provide an improved color generation apparatus and method for color liquid crystal displays, especially for displays suitable for use in avionics systems. In addition there is an ongoing need to provide a display and method of driving the display that maximizes the number of available color choices and useful viewing angles, without significantly detracting from the display brightness and life. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for a color liquid crystal display (CLCD). The apparatus comprises a processor coupled to the CLCD for receiving a character code and a color code and translating them into character and color pixel arrays that are overlaid and summed to produce a composite pixel array corresponding to the CLCD pixel array, where each entry in the composite array is used in conjunction with a color table to establish drive levels for each pixel in the CLCD. The character pixel array includes gray level color mixing as well as defining the character size and shape on the CLCD, and the color pixel array includes spatial shading color mixing, so that the composite array uses both techniques to determine the individual CLCD pixel drive levels, thereby providing a wider range of color choices without significant color dependence on viewing angle.

A method is provided for driving a color liquid crystal display (CLCD) to show one or more predetermined characters in a predetermined color. The method comprises, in either order, receiving a character code defining the character to be displayed and a color code defining the predetermined color, then in either order, determining a character pixel pattern from the character code and determining a spatial color pixel pattern from the color code, then combining the character pixel pattern and the spatial pixel pattern to produce a composite pixel pattern having combined pixel values at least for each pixel within a pixel pattern outline of the predetermined character, then, using the pixel values, obtaining red (R), green (G) and blue (B) pixel drive amounts for each pixel, and sending the pixel drive amounts to the pixels of the CLCD.

BRIEF DESCRIPTION OF THE DRAWINGS

The present invention will hereinafter be described in conjunction with the following drawing figures, wherein like numerals denote like elements.

FIGS. 4-6 show various look-up tables for implementing the present invention according to a preferred embodiment for an exemplary color;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1A:
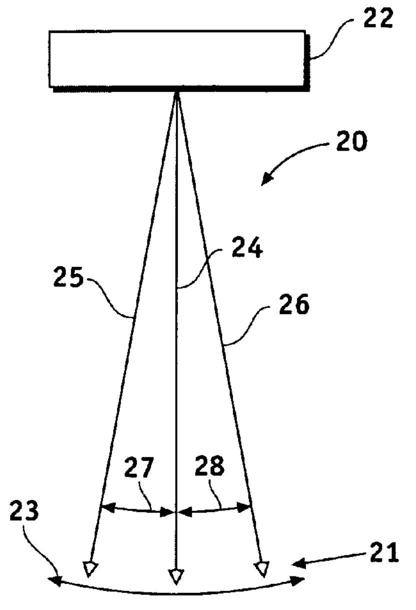
FIGS. 1A and 1B are simplified plan and side views of an observer positioned with respect to a liquid crystal display.
Figure 1B:
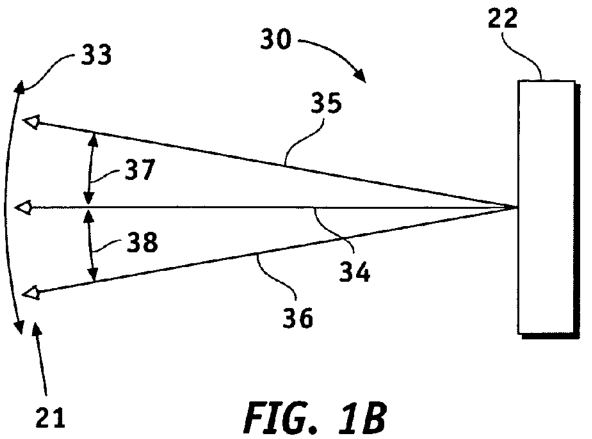

FIGS. 1A shows simplified plan view 20 and 1B shows simplified side view 30 of observer 21 positioned with respect to liquid crystal display 22. Display 22 emits light at different angles as indicated by rays 24-26 in FIG. 1A and rays 34-36 in FIG. 1B. FIG. 1A shows observer 21 in different azimuthal positions, for example along arc 23, receiving ray 24, or ray 25 or ray 26 depending upon the observer's position. Rays 25, 26 make angles 27, 28 with respect to central ray 24 in FIG. 1A. FIG. 1B shows observer 21 in different vertical positions, for example along arc 33, receiving ray 34, or ray 35 or ray 36 depending upon the observer's position. Rays 35, 36 make angles 37, 38 with respect to central ray 34 in FIG. 1B. One of the problems often associated with prior art color liquid crystal displays is that the color perceived by observer 21 can change depending upon the magnitude of angles 27, 28, 37, 38.

Figure 2:
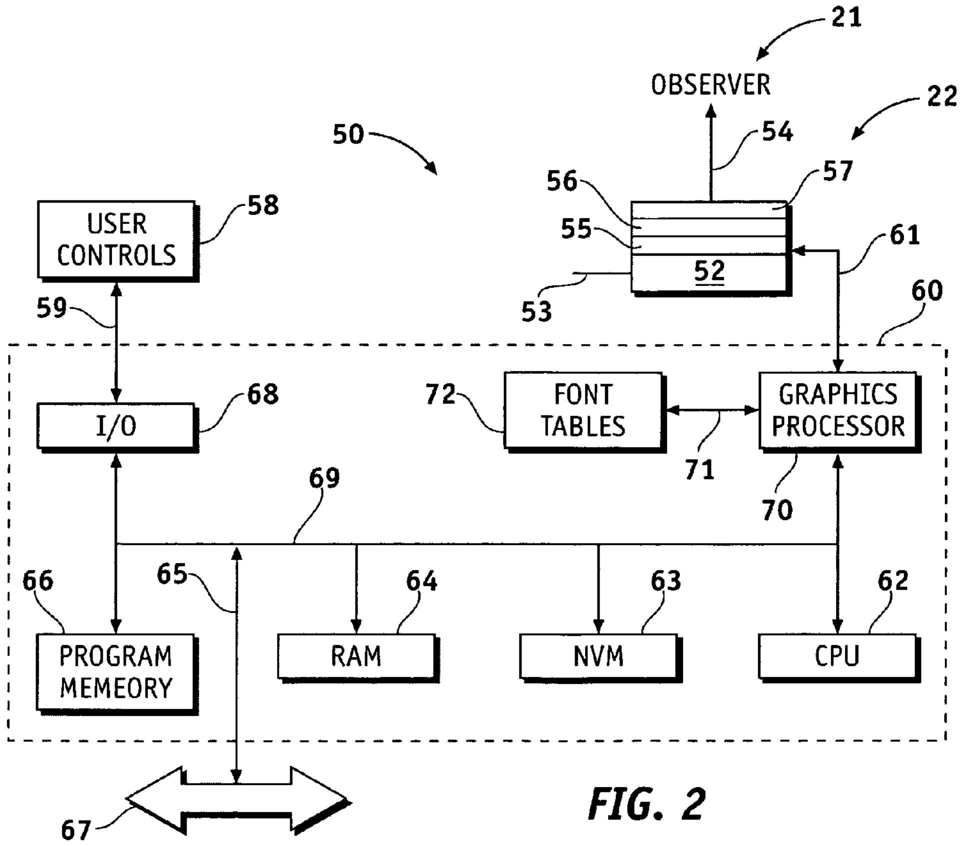
FIG. 2 shows a simplified electrical schematic of a display drive system, coupled to a color liquid crystal display; according to the present invention.

FIG. 2 shows simplified electrical schematic of display drive system 50, coupled to color liquid crystal display (CLCD) 22, according to an embodiment of the present invention. The depicted CLCD 22 includes several layers or regions, for example, and not intended to be limiting, backlight 52, thin film transistor (TFT) drive array layer 55, liquid crystal region layer 56 (hereafter active region 56) and color filter layer 57. Backlight 52 receives power via lead or connection 53 and produces substantially white light directed toward layers 55, 56, 57. In the preferred embodiment, backlight 52 employs an array of white light emitting diodes. TFT layer 55 receives drive signals from graphics processor 60 via leads or bus 61 and provides the appropriate signals to CLCD layer 56 to cause its light transmission to vary pixel by pixel. Filter layer 57 contains pixel-size regions for each primary color: red, green and blue. Each pixel region in layer 57 corresponds in size and location to an individual TFT on TFT array layer 55. The alignment of the liquid crystal in region 56 is electrically switched by the drive voltage to the TFT. When the liquid crystal in region 56 is electrically aligned between the TFT active pixels in layer 55 and the overlying portion of color filter layer 57, light is emitted from CLCD 22 in direction 54 toward observer 21, and is red, green or blue depending upon the color of the filter portion over the individual TFT. Thus, by selectively energizing the corresponding TFT in layer 55 under the red, green or blue pixels of filter layer 57, a large number of different colored light combinations may be emitted by CLCD 22. As will be explained in more detail in connection with FIGS. 3-6, different combinations of colored pixels are energized to cause display 22 to present various messages.

The individual pixels of TFT array layer 55 are driven by display electronics system 60, which includes processor (CPU) 62, optional non-volatile memory (NVM) 63, temporary memory (RAM) 64, program memory 66, input-output (I/O) device 68 and graphics processor 70, all mutually coupled by bus or leads 69 so as to allow intercommunication. User controls 58 are coupled to I/O 68 by bus or leads 59 and graphics processor 70 is coupled to TFT array layer 55 of display 22 by bus or leads 61. Bus or leads 71 couple font table 72 to graphics processor 70. As will be more fully explained later, font tables 72 contain information used by graphics processor 70 to activate pixels of the desired color and intensity in the desired location on display 22 to convey the desired information. Display electronics system 60 is also preferably coupled through internal bus 69 and external bus or leads 65 to general systems bus 67 whereby it can receive commands and exchange information of interest to the general system (e.g., an avionics system, not shown). For example, and not intended to be limiting, display system 60 can receive a command from user controls 58 or general bus 67 or a combination thereof to show certain alphanumeric or symbol information such as, for example, current altitude. Based on information received from, for example, program memory 66, NVM 63, user input, or controls 58 and/or general systems bus 67, CPU 62 instructs graphics processor 70 to display altitude information present on general bus 67 in different colors depending upon the altitude value with respect to a predetermined minimum desired altitude. The predetermined minimum altitude may be stored for example in NVM 63 or elsewhere, or set by user controls 58 or a combination thereof. Assume that the minimum desired altitude has been set at 3000 meters. Then, in response to instructions retrieved from program memory 66 and/or general system bus 67, graphics processor 70 in cooperation with font tables 72, displays altitudes over 3100 meters in green, altitudes between 3001 and 3100 meters in amber, and altitudes at or below 3000 meters in red. Those of skill in the art will understand that this is merely exemplary and is not intended to be limiting. System 50 is able to provide the commanded characters and/or symbols in the commanded colors with adequate brightness, color fidelity, and viewing angle. The preferred means for accomplishing this is explained more fully in connection with FIGS. 3-6.

Figure 3A:
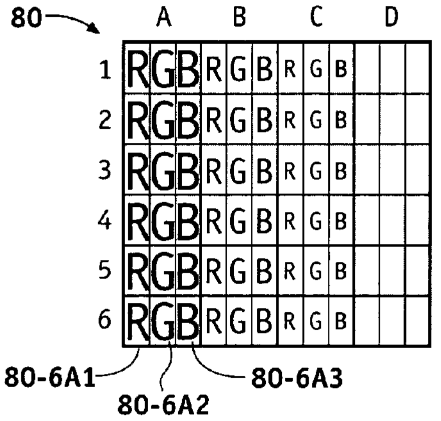
FIGS. 3A-3E are simplified plan views of a portion of the liquid crystal display different condition of excitation.

FIGS. 3A-3E show simplified plan views of portions 80, 82, 84, 86, 88 respectively of liquid crystal display 22 of FIGS. 1-2, under different conditions of excitation. Merely for convenience of explanation and not intended to be limiting, portions 80-88 have four columns (A,B,C,D) and six rows (1,2,3,4,5,6) of tri-color pixels. Each tri-color pixel has three separately addressable sub-pixels, one red (denoted "R"), one green (denoted "G") and one blue (denoted "B"). Thus, in each portion 80-88 there are 4×6=24 pixels of each color and a total of 3×24=72 individually activated pixels. For convenience of explanation, the following convention is used herein. The letters R, G, B identify the color of the respective pixel and the size of the letters indicates the relative intensity of the drive being supplied and therefore the illumination from that pixel. The larger the letter the brighter the pixel. For example, in FIG. 3A, all three colors of pixels in column A are being exited at the maximum level so as to have their maximum brightness, while all three colors in column B are excited at a lower level and therefore have lower luminance or brightness. All three colors in column C have still lower excitation and still lower luminance and all three colors in column D are not excited at all and therefore exhibit little or no luminance. For simplicity, in FIG. 3A, each row has the same configuration: column A is the brightest, column B is less bright, column C is even less bright and column D is OFF. The difference in brightness is achieved by varying the excitation voltage applied to the TFT(s) driving the liquid crystal pixel under the corresponding region of the colored filter layer. Because the R, G, B pixels in each tri-pixel, are equally excited, the resulting light output from columns A-C will be substantially white, but of different intensity in each column; column A brightest, column B less bright, column C still less bright and column D dark. The purpose of display portion 80 in FIG. 3A is to illustrate the convention used in FIGS. 3B-E where different ways of exciting the pixels to obtain different colors and viewing angles are shown.

Figure 3B:
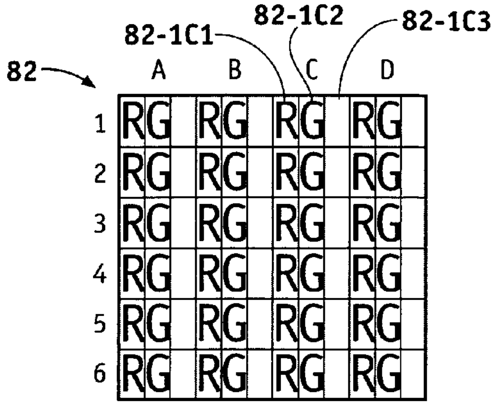

For convenience of explanation and not intended to be limiting, FIGS. 3B-E illustrate various ways of obtaining an approximately amber output from screen portions 82-88. In order to produce amber, no blue is used; therefore all blue ("B") pixels are dark (OFF) in these examples. This is not intended to be limiting, but occurs merely because of the colors (yellowish or amber) chosen for purposes of explanation. Persons of skill in the art will understand that if a different example color were chosen, different combinations of the R, G, and B pixels would be used. In FIG. 3B, a yellowish output is created by turning on all red (R) and green (G) pixels at substantially the same brightness level, as indicated by letters R, G having substantially the same size. For example, red pixel 82-1C1 and green pixel 82-1C2 are turned on full while blue pixel 82-1C3 is dark. This pattern is repeated in each tri-pixel of array 82. Because the intensity of the individual color pixels is the same, this is referred to as "equal gray level mixing," that is, there are no intensity variations from tri-pixel to tri-pixel. While maximum drive is used on all R, G pixels (e.g., shown by the largest letter size) this is merely for convenience of illustration. Equal gray level mixing can occur at any drive level as long as the drive levels for the various colors being used are chosen to provide equal light output from red and green (or whatever colors are being used). When maximum drive is used, the brightness of the yellowish color produced in the example of FIG. 3B is good, but the number of colors that can be produced is significantly limited.

Figure 3C:
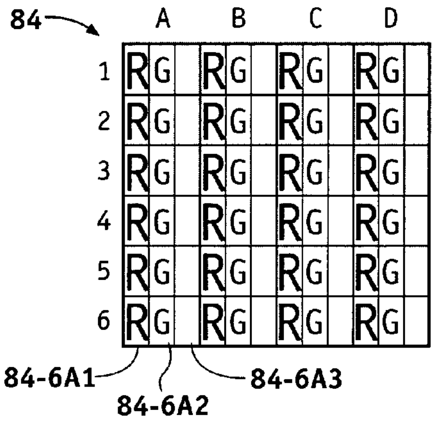

FIG. 3C showing array portion 84, illustrates the use of different pixel drive levels as another way of producing a yellowish color, in this case an amber or darker yellow. In this example, all red (R) pixels receive maximum drive and produce maximum brightness, but adjacent green (G) pixels receive a lower level of drive and therefore produce less than maximum brightness, as shown by the smaller relative size of the letter "G" compared to the letter "R." This arrangement is referred to as unequal gray level mixing. This approach offer many more possible colors than the approach of FIG. 3B, but suffers from the disadvantage that there is a significant color shift with viewing angle. A further difficulty with this approach is that as certain pixels receive less and less drive compared to other pixels, that is as the ratio of drive on the dimmed pixels to the drive on the bright pixels gets smaller and smaller, the brightness degrades and color shift with viewing angle gets worse.

Figure 3D:
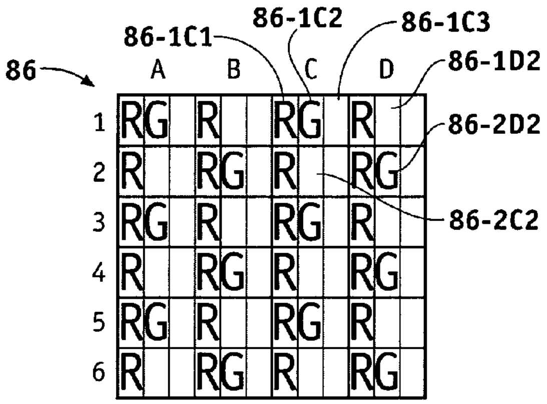

FIG. 3D showing array portion 86, illustrates the use of what is referred to as spatial shading to achieve an approximately amber color. All operating pixels are energized at the same brightness level. In this example, all of the red pixels are ON but only half of the green pixels are ON. Thus, referring by way of example to columns C and D of array 86, red pixel 86-1C1 and all other red pixels in column C (and the other columns) are ON, and green pixels 86-1C2 and 86-2D2 are ON and green pixels 86-2C2 and 86-1D2 are OFF. The ON and OFF green pixels in adjacent columns are staggered to improve the uniformity of illumination. As before, all blue pixels are OFF because the desired color is amber. This approach has a good field of view (little color shift with viewing angle) relative to the others described above but is limited in its ability to provide a wide range of colors or a particularly desired color. Some colors cannot be achieved at all, or only with spatial shading so coarse that the low fill factor of the minor color is visible in the display. This is undesirable.

Figure 3E:
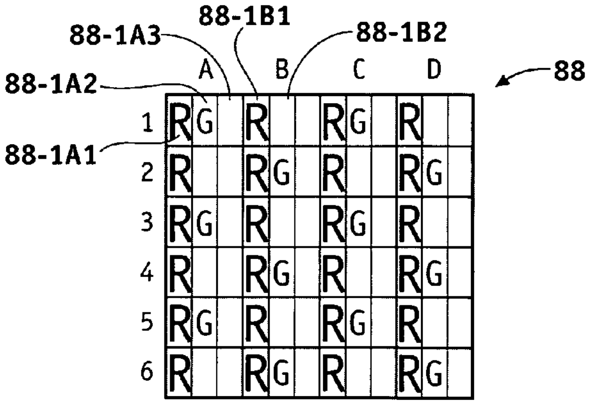

FIG. 3E shows display portion 88 illustrating the preferred arrangement according to the present invention for producing both a wide range of colors of adequate brightness and with good viewing angle color performance. The arrangement of FIG. 3E combines gray level and spatial mixing. For example, the arrangement of FIG. 3E easily provides the desired amber color by reducing the drive level on the green (G) pixels, as indicated by the smaller size of the letters "G" and illuminating only every other green pixel in a staggered pattern but at a different (e.g., lower) luminance level than used for the red pixels. In this example, the green pixels are driven at about 70% of their maximum luminance while the red pixels are driven to 100%, as indicated by the different size of the "R" and "G" letters on the pixels. Thus, red pixels 88-1A1 and 88-1B1 have a higher luminance than green pixel 88-1A2, and blue pixels 88-1A3 and 88-1B2 are OFF. The staggered pattern of illumination of the green pixels is repeated throughout the array where the desired amber color is needed. To achieve the same color without using spatial shading, the green pixels would have to be driven at about 30% of maximum luminance compared to the red pixels. This large difference in pixel drive levels would cause the color to shift over the field of view. Thus, the combination of gray level and spatial shading implemented in FIG. 3E provides superior results.

Figure 4:
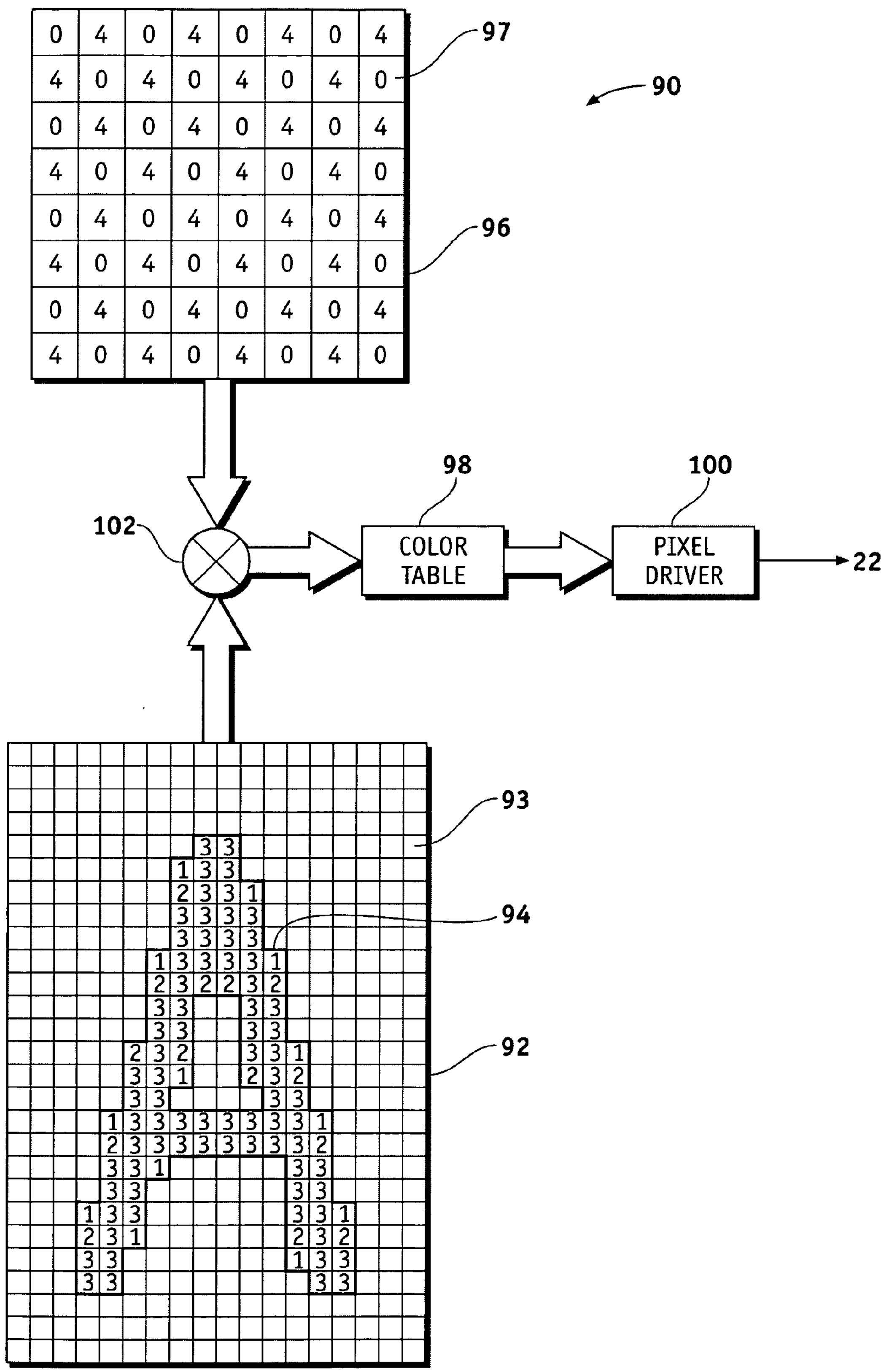

FIG. 4 shows look-up tables or patterns 90, stored for example, in font tables 72 and/or NVM 63 for use by system 50 in implementing the present invention according to a preferred embodiment. Table 92 is an example of a typical 18×27 character pattern table for the letter "A" used by graphic processor 70. Each square 93 in table 92 represents a tri-pixel, that is, each square 93 contains R, G, B sub-pixels. Graphic processor 70 (not shown in FIG. 4) turns on one or more sub-pixels in each tri-pixel within outline 94 of array or table 92 to produce, for example, the letter "A." The numbers 1, 2, 3 shown on the pixels within outline 94 determine, when passed through color table 98, the relative drive levels to the R, G, B sub-pixels in order to produce a particular target color. When used without color pattern table 96, table 92 provides unequal gray level mixing for determining the resulting character color. Persons of skill in the art will understand that the letter "A" is used merely by way of illustration and not intended to be limiting. Any alphanumeric character or other graphic that will fit within table or pattern 92 may be displayed. While character pattern or table 92 is described as being an 18×27 array, this is merely exemplary and not limiting. Persons of skill in the art will understand that an array of any one of numerous sizes consistent with the required character resolution and display size may be used.

Color pattern or array 96 is similar to array 92 but for implementing spatial shading in order to produce by way of example and not intended to be limiting a particular shade of amber. Array 96 alone produces staggered spatial shading analogous to that shown in FIG. 3D where every other green pixel is dark. Persons of skill in the art will understand that for other colors, the entries in the boxes of array 96 will be different. Each box in array 96 corresponds to a tri-pixel box in array 92. Array or table 96 is shown as being an 8×8 array but this is merely for convenience of explanation and is generally hardware determined. In the preferred arrangement, a type 69000 graphics processor chip manufactured by Asiliant Technologies, San Jose, Calif. was utilized for driving CLCD 22. The exemplary 8×8 and 18×27 row by column dimensions of tables or patterns 92, 96 are suitable for use with the 69000 chip but other row by column arrangements can be used with other graphics processors. For example, with an alternating spatial shading arrangement like that shown in FIG. 3D, a 2×2 array is sufficient. The entries in each box 97 of table 96 determine the spatial shading employed in display 22 and, in combination with the entries in table or array 92 determine the color of the letter or other alphanumeric or graphic being generated by system 50. The format of tables 92, 96 are desirably such that they may be superposed to produce a result interpretable by color table 98 to generate signals to pixel driver 100 that, in turn, supplies the drive signals to the individual R, G, B pixels in display 22 (pixel driver 100 is equivalent to graphics processor 70 of FIG. 2). Array adder 102 is used to combine tables 92, 96, tri-pixel by tri-pixel, i.e., square by square, as explained below. The functions of array adder 102, color table 98 and pixel driver 100 are provided by system 60 of FIG. 2.

Arrays or tables 92, 96 are conveniently but not essentially combined by superposition, that is, the content of each tri-pixel (square) in table 96 is added algebraically to the content of the corresponding tri-pixel (square) in array 92 in array adder 102 and the result fed to color table 98. The result of combining arrays 92, 96 is illustrated in composite array 110 of FIG. 5. The blank squares in array 92 outside of outline 94 are assumed to have value zero. Thus, for those tri-pixels in array 92 outside of outline 94, the summation in array 110 yields just the alternating 0, 4 values of array 96 for the desired amber color. Persons of skill in the art will understand based on the explanation herein that a different pattern would be used to achieve other colors. Within outline 94 where array 92 has various values 1, 2, 3, these numbers are added square by square to the numbers 0, 4 shown square by square in array 96 to obtain composite array 110. In composite array 110, the numbers in the squares within outline 94 have values 1, 2, 3, 5, 6, 7. While the foregoing arrangement is preferred, any means for combining a spatial array matrix with a character generator gray level matrix may be used.

The values in composite array 110 are fed to color table 98, which is shown in detail in FIG. 6. The entries in color table 120 of FIG. 6 relate the composite array values (abbreviated as "CA values" or "CA #'s") to the relative drive level for each R, G, B pixel in CLCD 22. The abbreviation "GL" stands for "gray level" and refers to the relative pixel excitation level for gray level color mixing as explained in connection with FIG. 3C. If the CA value is '0' or '4', then according to color table 120, this corresponds to a pixel drive level of '0' for all three colors R, G, B. Thus, all pixels outside of outline 94 will be dark. The values 132, 168, 172, 212, 220, 252 shown in table 120 of FIG. 6 for different CA#'s, conveniently refer to driver addresses where the actual pixel drive levels (or intermediate signals controlling the pixel drive levels) are stored. In the example of table 120 and for convenience of explanation the higher the driver address number, the higher the drive level to the pixel, although this is not essential. For example, in table 120 driver address 172 corresponds to greater pixel drive and therefore greater pixel brightness than, say, driver address 132. Driver address 252 corresponds to the maximum available drive level and 0 corresponds to the minimum (e.g., no drive). For convenience of explanation, the drive address values shown in table 120 may be thought of as expressing relative pixel brightness. However, the relationship between driver address and pixel drive level need not be linear. Persons of skill in the art will understand based on the description herein how such an arrangement can be implemented.

If the CA value is "1", this corresponds to unequal gray level two (GL-2) wherein, in our example of an approximately amber "A", the red pixels are supplied with driver address 172 compared to the green pixels with driver address 132. The maximum excitation corresponds to driver address 252. This provides unequal gray level mixing as in FIG. 3C for those pixels. Similarly with CA values 2 and 3 where the relative excitation levels are controlled by driver addresses R(212), G(168) and R(252), G(220), respectively, there is also unequal gray level mixing. However, for CA values 5, 6, 7 spatial mixing is included, in that for this amber example only red pixels are illuminated and all green and blue pixels are dark where CA values 5, 6, 7 occur in FIG. 5. Further, depending upon the CA value, the excitation level of the red pixels is different, specifically CA numbers 5, 6, 7 correspond to gray levels GL-2, GL-4, GL-6 where the relative red pixel excitation levels for the different pixels are expressed by drive addresses 172, 212 and 252 respectively with a maximum drive level corresponding to address 252. It will be appreciated that the present invention provides for a mixture of unequal gray level excitation and spatial shading excitation of the various colored pixels. As will be subsequently explained in more detail, this produces a superior result. Persons of skill in the art will understand based on the description herein, that for other colors, the mix of spatial and unequal gray level excitation levels for the various R, G, and B pixels will be different. Also, the particular pixels being excited will also depend upon the shape of the alphanumeric or graphic being displayed.

Figure 7:
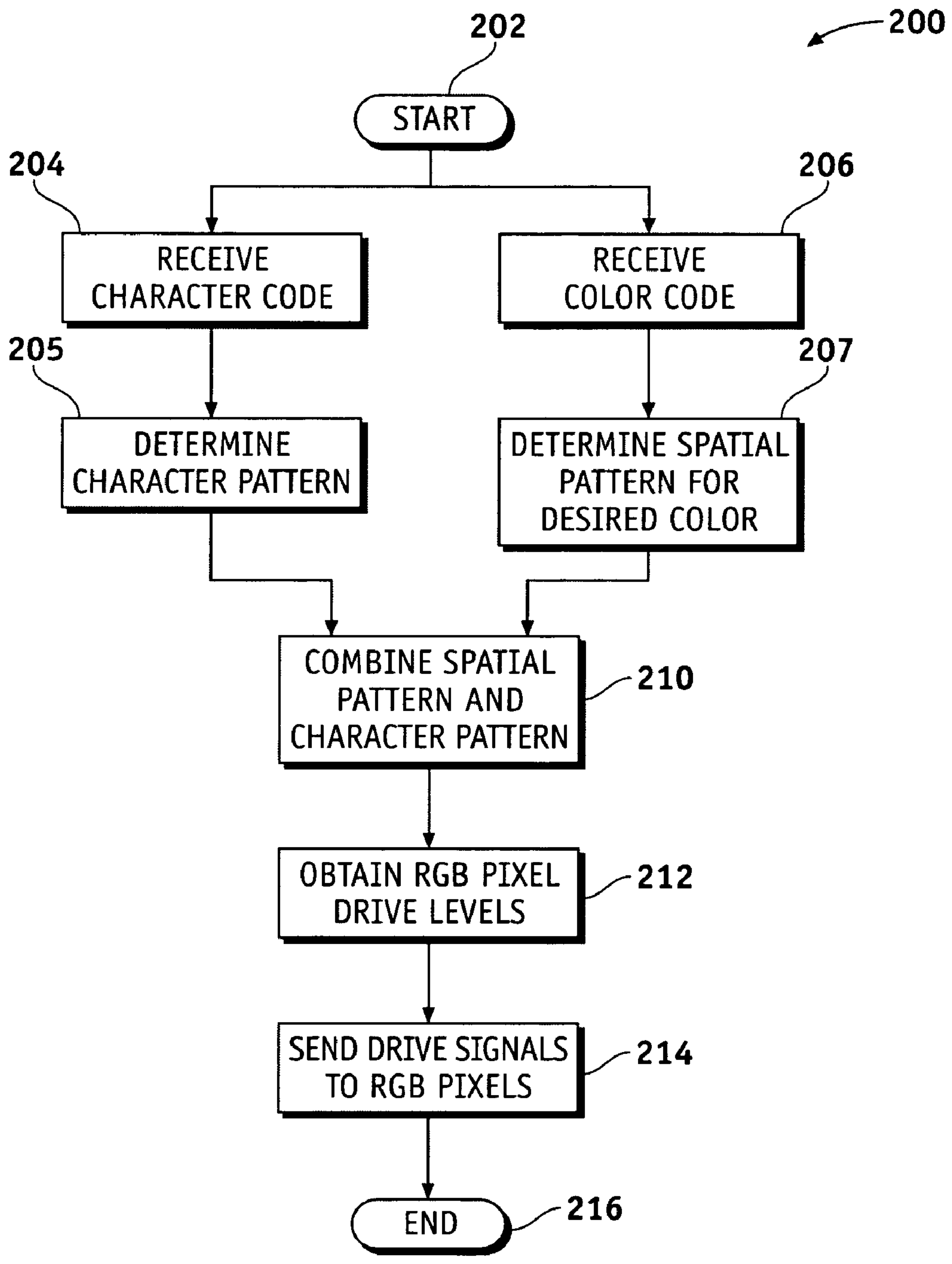
FIG. 7 shows a simplified flow chart illustrating the method of the present invention.

FIG. 7 shows a simplified flow chart illustrating method 200 of the present invention. Method 200 begins with start 202 that preferentially occurs whenever system 50 seeks to display a new character or graphic. In step 204, CPU 62 and/or graphics processor 70 receives the code identifying the desired character, as for example, an ASCII code. In step 205 the pixel pattern needed to display that character is determined, as for example, through use of a look up table or other means stored in font tables 72. The result is, generally, a character array similar to array 92 of FIG. 4, however, this is not essential and any means for character generation may be used. In step 206 the code for the color(s) in which the character is to be presented is received by CPU 62 and/or graphics processor 70, and in step 207, analogous to step 206, the spatial mixing color array (e.g., array 96) needed to produce that color is obtained, for example from font tables 72 and/or NVM 63 or elsewhere. The results of steps 205, 207 are combined in step 210 where the spatial color array (or equivalent) and the character array (or equivalent) are combined to produce a composite array, such as for example array 110 of FIG. 5 or equivalent. The composite array values are used in conjunction with a color table such as color table 120 of FIG. 6 to obtain the relative red (R), green (G), blue (B) pixel drive levels for the individual pixels in CLCD array 22. In subsequent step 214, these drive levels are sent by graphics processor 70 to the individual pixels in CLCD array 22 and the process thereafter terminates at END 216. Step groups 204-205 and 206-207 may be performed in either order. All that is important is that the results of step groups 204-205 and 206-207 be available to be combined in step 210.

Method 200 may be repeated each time a new character or graphic is to be displayed. If there is no change in the color code and the previous spatial pattern determined in step 205 is still available in memory, then this previously determined spatial pattern may be reused. Conversely, if the character is unchanged, but the color is changed, then a new spatial color pattern is determined and combined with the previously determined character pattern. The foregoing explanation has been presented for the situation where only a single character is being displayed, but this is merely for convenience of description. Those of skill in the art will appreciate based on the description herein that character generation and display can also occur in groups, all the same color or with a mixture of colors. In those situations, the character arrays and spatial color arrays may be combined in groups to produce composite arrays for the groups of characters, analogously to the single character method described above. Thus, the above-described method is useful for multiple as well as single characters.

Figures 8, 9:
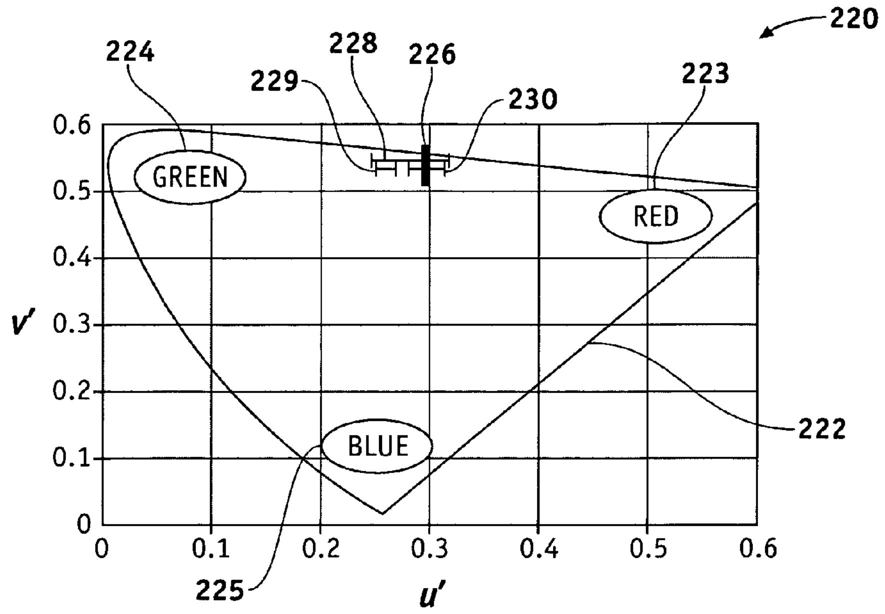
FIG. 8 shows a 1976 u', v' CIE Chromaticity Diagram on which the present invention's viewing angle shift and color matching capability are compared to prior art approaches, for an exemplary color.
FIG. 9 is a table wherein the experimental results illustrated graphically in FIG. 8 are presented in numeric and descriptive form.

FIG. 8 shows 1976 u', v' CIE Chromaticity Diagram 220 on which the present invention's viewing angle shift and color matching capability are compared to prior art approaches, for an exemplary color (amber). Such Chromaticity Diagrams are well known in the art and are described, for example by G. J. and D. G. Chamberlin in *Color: Its Measurement, Computation and Application*, Heyden and Sons Press Ltd, 1980, pages 60 ff. The human visible color spectrum is contained within outline 222. Region 223 is the locus of primary red (R), region 224 the locus of primary green and region 225 the locus of primary blue. White is in the regions of approximately u'~0.22 and v'~0.48. Intermediate shades have other u', v' values. Marker 226 indicates the exemplary desired color, an amber shade, at about u'~0.3 and v'~0.55. FIG. 9 is a table wherein the experimental results illustrated graphically in FIG. 8 are presented in numeric and descriptive form.

Referring now to FIGS. 8-9, brackets 228-230 in FIG. 8 shows the results obtained using different methods of color generation and different viewing angles. Azimuthal angles 27 and 28 were varied from 0 to 45 degrees, vertical angle 37 was varied from 0 to 5 degrees and vertical angle 38 was varied from 0 to 35 degrees. Bracket 228 in FIG. 8 corresponds to line 252 in table 250 of FIG. 9 wherein color generation employed gray level mixing, such as has been previously described in connection with FIGS. 3B-3C. It will be noted that this method of color generation was able to achieve target amber color 226 in FIG. 8, but as noted in line 252 of FIG. 9 and shown graphically by bracket 228 in FIG. 8, a comparatively large color shift occurs for different viewing angles. As noted earlier, this is undesirable. Thus, although gray level mixing allowed the target color to be achieved, the comparatively large color shift indicates that it is not a desirable candidate for color generation applications where color fidelity as a function of viewing angle is important. Avionics systems are examples of such applications.

Bracket 229 in FIG. 8 and line 254 in table 250 of FIG. 9 illustrates the results obtained using spatial shading for color generation. It will be noted that this method of color generation yielded only a small color variation with changes in viewing angle (which is desirable), but was not able to achieve target color 226 (which is undesirable). This is because with spatial shading, the number of colors that can be produced is much reduced. Where the target color happens to be among those achievable by spatial shading, then this is a desirable approach in terms of viewing angle color independence, but where some of the colors that must be displayed are outside the range of those achievable using spatial shading, this approach is not attractive.

Bracket 230 in FIG. 8 and line 256 in Table 250 of FIG. 9 are the result of combining both gray level mixing and spatial shading according to the present invention, as has been already described in connection with FIGS. 2-7. It will be noted that the invented approach is able to achieve target color 226, which is not possible with spatial shading alone, and also has an angular color shift that is 40% less than that obtained with gray level mixing alone. While the angular color shift is larger than with spatial shading alone, the fact that spatial shading was not able to produce the target color rules it out as a viable approach in this situation. Thus, the invented approach of using both gray level mixing and spatial shading at the same time, in the manner described herein, provides a significant overall improvement over the prior art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A color liquid crystal display (CLCD) system, comprising:

a CLCD having therein multiple substantially red (R), green (G), and blue (B) pixels, each pixel adapted to receive excitation in varying magnitude so as to cause different amounts of R, G, and B light to exit each pixel in response to the excitation, wherein the CLCD includes an input for receiving excitation information for the pixels; and a processor having an output coupled to the input of the CLCD for supplying the excitation information thereto, and for receiving at least one character code defining a character pixel map comprising an array of pixels having multiple values therein within a pixel pattern outline for a character to be displayed by the CLCD, and at least one color code defining a staggered spatial shading color map determinative in part of a color in which the character is to be displayed by the CLCD, the processor operable to combine the staggered spatial shading color map with the character pixel map to produce a composite pixel map incorporating both staggered spatial shading and gray level mixing for the pixels of the CLCD and to supply the excitation information to the CLCD based at least in part on the composite pixel map.

2. The system of claim 1 wherein the processor comprises a graphics processor and one or more memory devices for translating the character code into the character pixel map and translating the color code into the staggered spatial shading color map and combining them to produce the composite pixel map and thereafter using values in each pixel of the composite pixel map in conjunction with a color table to convert said values into corresponding excitation drive signals for delivery by the graphics processor to corresponding pixels of the CLCD.

3. The system of claim 2 wherein the processor combines the character pixel map and the staggered spatial shading color map by superposition to produce the composite pixel map.

4. The system of claim 2 wherein the processor combines first entries in the character pixel map with second entries in the staggered spatial shading color map by algebraically adding the first and second entries whose sums are used to populate corresponding third entries in the composite pixel map.

5. A method for driving pixels of a color liquid crystal display (CLCD) to display a character in a predetermined color, the method comprising:

receiving a character code defining the character to be displayed and a color code defining the predetermined color;

determining a character pixel pattern from the character code;

determining a staggered spatial color pixel pattern from the color code;

combining the character pixel pattern and the staggered spatial pixel pattern to produce a composite pixel pattern incorporating both staggered spatial shading and gray level mixing, and having combined pixel values at least for each pixel within a pixel pattern outline of the character to be displayed;

determining red (R), green (G), and blue (B) pixel drive magnitudes for each pixel based at least in part on the combined pixel values; and sending the pixel drive magnitudes to the pixels of the CLCD;

wherein the step of determining a character pixel pattern comprises determining an array of pixels having multiple values therein within the pixel pattern outline.

6. The method of claim 5 wherein the step of determining the staggered spatial color pixel pattern comprises determining an array of pixels having at least two groups of values therein, with first values in the first group of pixels and second values in the second group of pixels.

7. The method of claim 5 wherein the step of determining the staggered spatial color pixel pattern comprises determining an array of pixels having at least two groups of values therein, with first values in the first group of pixels and second values in the second group of pixels and wherein the step of determining a character pixel pattern comprises determining an array of pixels having multiple values therein within the pixel pattern outline and wherein some of the multiple values are different than the first and second values.

8. The method of claim 7 wherein the step of combining the character pixel pattern and the staggered spatial pixel pattern to produce a composite pixel pattern having combined pixel values at least for each pixel within a pixel pattern outline of the predetermined character, comprises adding the first and second values to the multiple values pixel by pixel to obtain the combined pixel values.

9. The method of claim 7 wherein the using step comprises entering the combined pixel values, pixel by pixel into a color table to determined therefrom the relative pixel drive amounts for each red, green and blue pixel of the CLCD.

10. The method of claim 5 wherein the using step comprises:

using the combined pixel value for each pixel to identify a drive address for the pixel; and using the drive address to obtain the drive amount for the pixel.

11. The method of claim 5 wherein the combining step comprises combining the character pixel pattern and the staggered spatial pixel pattern so that at least some portions of the combined pixel pattern have no spatial mixing.

12. A color display apparatus comprising:

a color liquid crystal display (CLCD) having an array of pixels;

color table for combining spatial and gray level color mixing; and a processor for receiving a character code and a color code and translating the codes into character and color pixel arrays that are overlaid and summed to produce a composite pixel array having multiple values and corresponding to the array of pixels of the CLCD, wherein the character pixel array comprises an array of pixels having multiple values therein within a pixel pattern outline, and where each entry in the composite array is used in conjunction with the color table to establish drive levels for each pixel in the CLCD, the character pixel array providing gray level color mixing and the color pixel array providing spatial shading color mixing so that at least some of the individual CLCD pixel drive levels involve a combination of spatial shading and gray level color mixing, wherein the processor is coupled to the CLCD and the color table.

13. A multicolor graphic generator for displaying a color graphic on a color liquid crystal display (CLCD) having a plurality of pixels, the graphic generator comprising:

an input for receiving a first identification of a graphic and a second identification of a color in which the graphic is to be presented;

a memory; and a processor, coupled to the input and to the memory, for translating each identification into a pixel array corresponding to the CLCD pixels, the first identification yielding a first pixel array defining an outline of the graphic where the pixels therein have first values comprising multiple levels, and correlating with gray level mixing, and the second identification yielding a second pixel array where the pixels therein have second values correlating with spatial shading, and for overlaying the first and second pixel arrays to produce a third composite pixel array having multiple values and whose entries are related at least in part to the sum of the first and second values, and the entries are used in connection with a color table stored in the memory to produce electrical drivel levels to be sent to the CLCD to display the color graphic.

* * * * *

UNITED STATES PATENT AND TRADEMARK OFFICE

CERTIFICATE OF CORRECTION

PATENT NO. : 7,411,589 B2
APPLICATION NO. : 10/837196
DATED : August 12, 2008
INVENTOR(S) : Victoria P. Haim et al.

It is certified that error appears in the above-identified patent and that said Letters Patent is hereby corrected as shown below:

Column 12, line 35 claim 13, “drivel” should be --drive--.

Signed and Sealed this

Twelfth Day of May, 2009

JOHN DOLL
*Acting Director of the United States Patent and Trademark Office*